April 25, 1939.  F. O. LANE  2,155,496

ATTACHING BUTTON

Filed Oct. 23, 1937

Inventor
Fred O. Lane,
By Minturn & Minturn,
Attorneys.

Patented Apr. 25, 1939

2,155,496

UNITED STATES PATENT OFFICE 2,155,496

ATTACHING BUTTON

Fred O. Lane, Indianapolis, Ind., assignor to Gates Manufacturing Company, Indianapolis, Ind.

Application October 23, 1937, Serial No. 170,567

1 Claim. (Cl. 24—255)

This invention relates to means for detachably securing one member to another such, for example, as a radiator cover to the grille of an automobile radiator or the like. It is a primary object of the invention to provide an extremely simple attaching means which may be readily operated but at the same time may not be removed without a special tool in order to prevent theft or unwarranted removal of the attached member.

Figure 1:
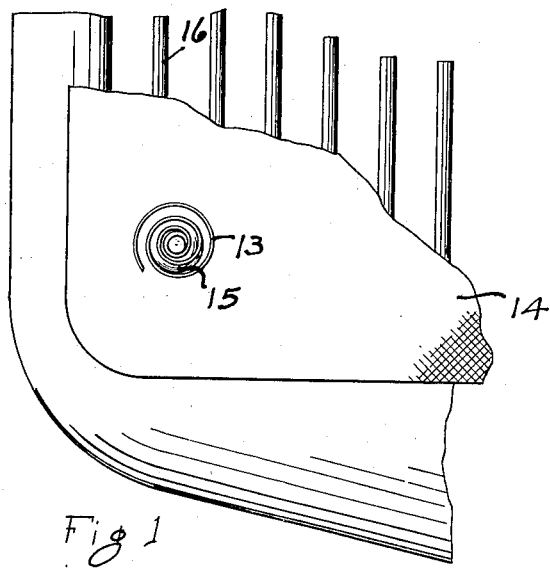
Figure 4:
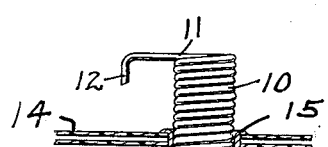
Figure 5:
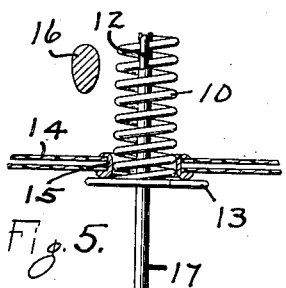
Figure 6:
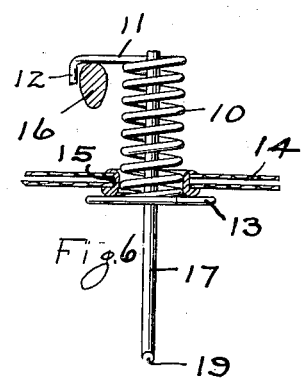
Figure 2:
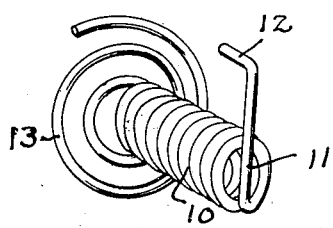
Figure 3:
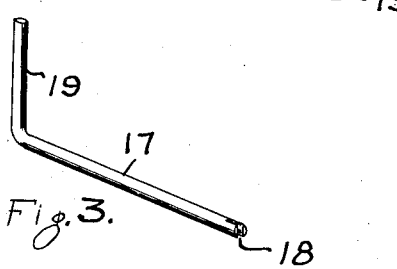

A further object of the invention is to provide a neat appearing attachment without unsightly projections. These and other important objects and advantages of the invention will become apparent to those versed in the art in the following description of one particular form of the invention as illustrated in the accompanying drawing, in which Fig. 1 is a front elevation of the invention as applied to a radiator cover:

Fig. 2 a rear view in perspective of the attaching member:

Fig. 3 a rear view in perspective of an operating tool:

Fig. 4 a top plan view of an attaching element inserted through a cover:

Fig. 5 a similar view with a tool applied to stretch the attaching element inwardly, and:

Fig. 6 a like view of the attaching element in engaged position.

Like characters of reference indicate like parts throughout the several views in the drawing.

Referring first to Fig. 2, a body 10 is formed by coiling wire into cylindrical shape. The inner end of the wire forming the coil is bent sharply to pass diametrically across the inner end of the cylinder to have its end 12 bent forwardly, in the form herein shown, to be parallel substantially with the side of the cylinder 10 but spaced therefrom.

The other end of the wire forming the cylinder 10 is bent around to form a head having a diameter exceeding that of the body 10. In the form herein shown, this head 13 is formed by carrying the front end of the wire around in a helix to have the turns therein spaced apart but in a common plane.

In using the attaching element thus described, the hooked end 12 is inserted through a hole provided in the member to be mounted. For the sake of showing one particular application of the invention, and in no manner limiting the scope of the invention, this member to be attached is described as a radiator cover 14. The hole through the cover 14 is preferably bounded by a grommet 15 forming a close but sliding fit with the body 10, Fig. 4. The head 13 forms a stop bearing against the forward side of the grommet.

In order to operate the device, it is necessary to engage the hooked end 12 around the rear side of some radiator element such as a bar 16 of the radiator grille. This engagement is accomplished by inserting a suitable tool through the cylinder 10 to push rearwardly on the bend 11 to carry the hooked end 12 back upon the bar 16 and then rotate the bend 11 so as to bring the other end 12 around behind the bar 16 to permit the tension in the body 10 to pull the bend 11 forwardly to the position as indicated in Fig. 6. In other words the various coils of the wire forming the body 10 make up a spring member which will compress the cover 14 rearwardly by the head 13 toward the grille bar 16 while the hooked end 12 is engaged as described.

A suitable tool for operating the attaching element is illustrated in Fig. 3 and comprises a metal bar 17 having a slot 18 entering from one end, of a sufficient width to permit that end of the tool to be inserted through the cylinder 10 to have the slotted end of the tool straddle the bend 11. The tool is provided with a turned over end 19 as a handle by means of which the bar 17 may be turned to bring the hooked end 12 around behind the member 16. The tool is of course withdrawn after the hooked end 12 is seated against the bar 16. It is evident that the cover 14 cannot be removed from the forward side without employing the tool again to release the hooked end 12.

While I have herein shown and described my invention in the one particular form, it is obvious that structural changes may be employed without departing from the spirit of the invention, and I therefore do not desire to be limited to that precise form beyond the limitations as may be imposed by the following claim.

I claim:

An attaching button comprising a single piece of spring wire coiled in a central hollow neck yieldingly extensible, the end of the wire at one end of the neck leaving tangentially therefrom and thence being outwardly helically coiled in a common plane to extend normally around that end as a flat head, and the other end of the wire at the opposite neck end being bent diametrically across that neck end normally of the neck axis to terminate at an appreciable distance beyond the side of the neck, and the other free end of said diametrically bent end being bent toward said head in the nature of a hook.

FRED O. LANE.